(12) United States Patent
Tann et al.

(10) Patent No.: US 7,370,268 B2
(45) Date of Patent: May 6, 2008

(54) SYSTEMS AND METHODS FOR MANAGING AND PRESENTING MULTIMEDIA AND CONTENT RICH DATA ON A REMOVABLE MEMORY APPARATUS

(75) Inventors: Johnathan P. Tann, San Francisco, CA (US); James P. Tann, Monterey, CA (US); Richard T. Culver, San Jose, CA (US)

(73) Assignee: Migo Software, Inc., Redwood City, CA (US)

( * ) Notice: Subject to any disclaimer, the term of this patent is extended or adjusted under 35 U.S.C. 154(b) by 229 days.

(21) Appl. No.: 10/632,335

(22) Filed: Aug. 1, 2003

(65) Prior Publication Data

US 2005/0028078 A1    Feb. 3, 2005

(51) Int. Cl.
*G06F 17/00* (2006.01)

(52) U.S. Cl. ......................... 715/201; 726/31
(58) Field of Classification Search ............. 715/500.1; 726/31

See application file for complete search history.

(56) References Cited

U.S. PATENT DOCUMENTS

| | | | |
|---|---|---|---|
| 5,014,234 A * | 5/1991 | Edwards, Jr. ................. | 726/33 |
| 5,923,884 A | 7/1999 | Peyret et al. | |
| 5,925,127 A * | 7/1999 | Ahmad ......................... | 726/31 |
| 6,157,917 A | 12/2000 | Barber et al. | |
| 6,405,362 B1 | 6/2002 | Shih et al. | |
| 6,711,685 B1 * | 3/2004 | Schaal et al. ................. | 726/31 |
| 6,795,863 B1 * | 9/2004 | Doty, Jr. ....................... | 709/231 |
| 6,799,277 B2 * | 9/2004 | Colvin .......................... | 726/22 |
| 6,974,076 B1 * | 12/2005 | Siegel .......................... | 235/380 |
| 2002/0057799 A1 * | 5/2002 | Kohno ......................... | 380/228 |
| 2002/0091930 A1 * | 7/2002 | Kohl et al. .................. | 713/182 |
| 2002/0091943 A1 * | 7/2002 | Lau .............................. | 713/201 |
| 2003/0079122 A1 * | 4/2003 | Asokan et al. .............. | 713/156 |
| 2003/0140230 A1 * | 7/2003 | de Jong et al. ............. | 713/182 |
| 2003/0170006 A1 * | 9/2003 | Bogda et al. ................. | 386/96 |
| 2003/0217271 A1 * | 11/2003 | Calder ........................ | 713/173 |

(Continued)

FOREIGN PATENT DOCUMENTS

| | | |
|---|---|---|
| EP | 1304702 | 4/2003 |
| WO | WO 03/034267 | 4/2003 |

OTHER PUBLICATIONS

Keyt, "Benefits of Web Site Copyright Registration" Archived Jun. 9, 2002 http://www.keytlaw.com/Copyrights/benefits.htm.*
"About Disk Marketing", www.discmarketing.com.
"Open AdStream®—Overview and Cookie Targeting Module", www.247realmedia.com.

*Primary Examiner*—Stephen Hong
*Assistant Examiner*—Adam Queler
(74) *Attorney, Agent, or Firm*—Fliesler Meyer LLP

(57) ABSTRACT

The various embodiments disclosed are generally directed towards systems and methods for managing and displaying content rich data, such as multimedia, residing on a removable memory apparatus inserted into a handheld device. In one aspect of the invention, a method comprises launching and displaying the content rich data soon after the device is inserted into a handheld device and monitoring the number of times the content rich data was launched and displayed. If the content rich data was launched a specific number of times, then the content rich data is deleted from the handheld device.

27 Claims, 7 Drawing Sheets

U.S. PATENT DOCUMENTS

2004/0128324 A1* 7/2004 Sheynman et al. ......... 707/200
2004/0133794 A1* 7/2004 Kocher et al. .............. 713/193
2004/0220879 A1* 11/2004 Hughes ....................... 705/57
2005/0081042 A1* 4/2005 Venkatesan et al. ........ 713/176
2005/0086518 A1* 4/2005 Tanahashi ................... 713/200
2005/0192871 A1* 9/2005 Galuten et al. ............... 705/26

* cited by examiner

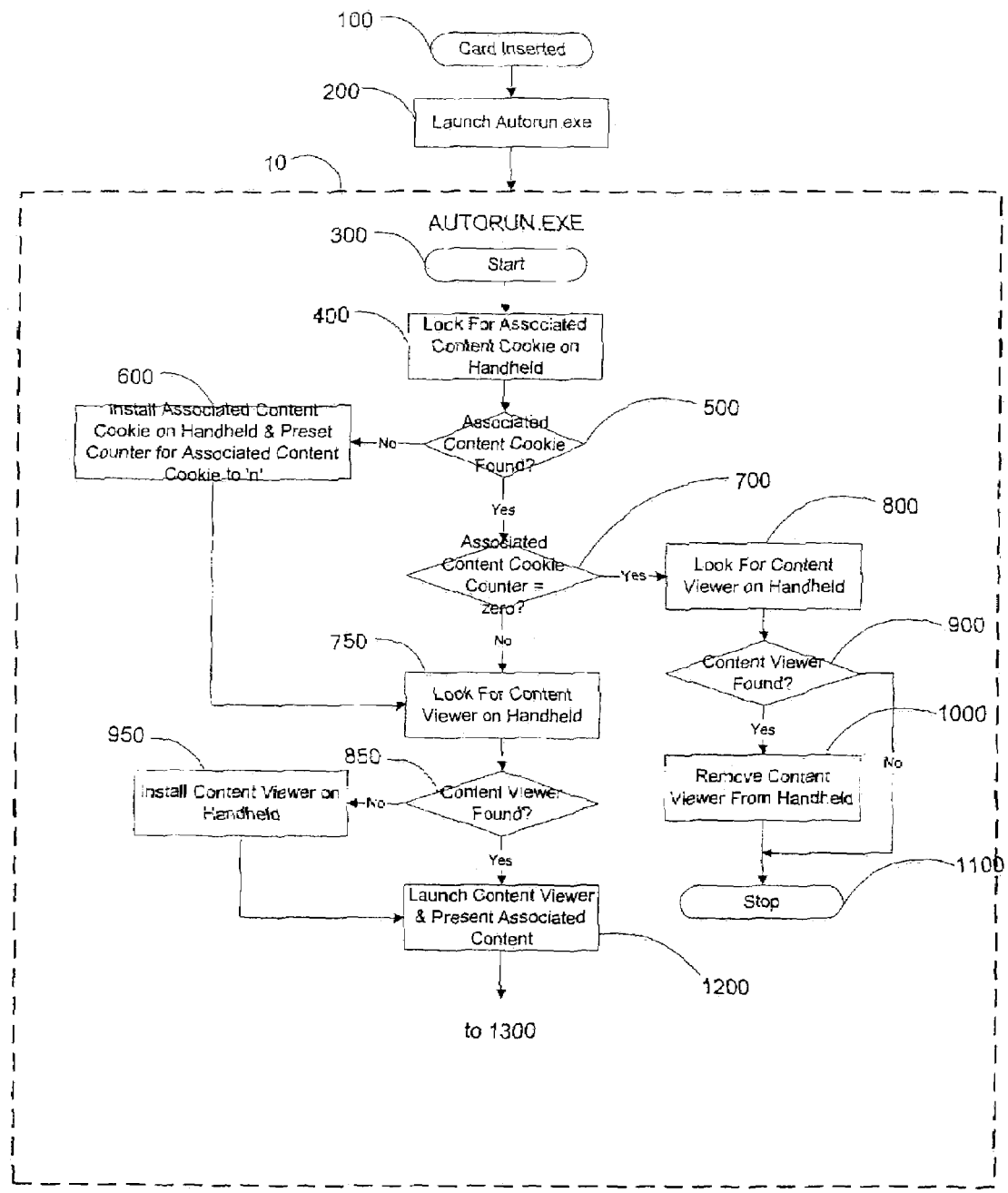

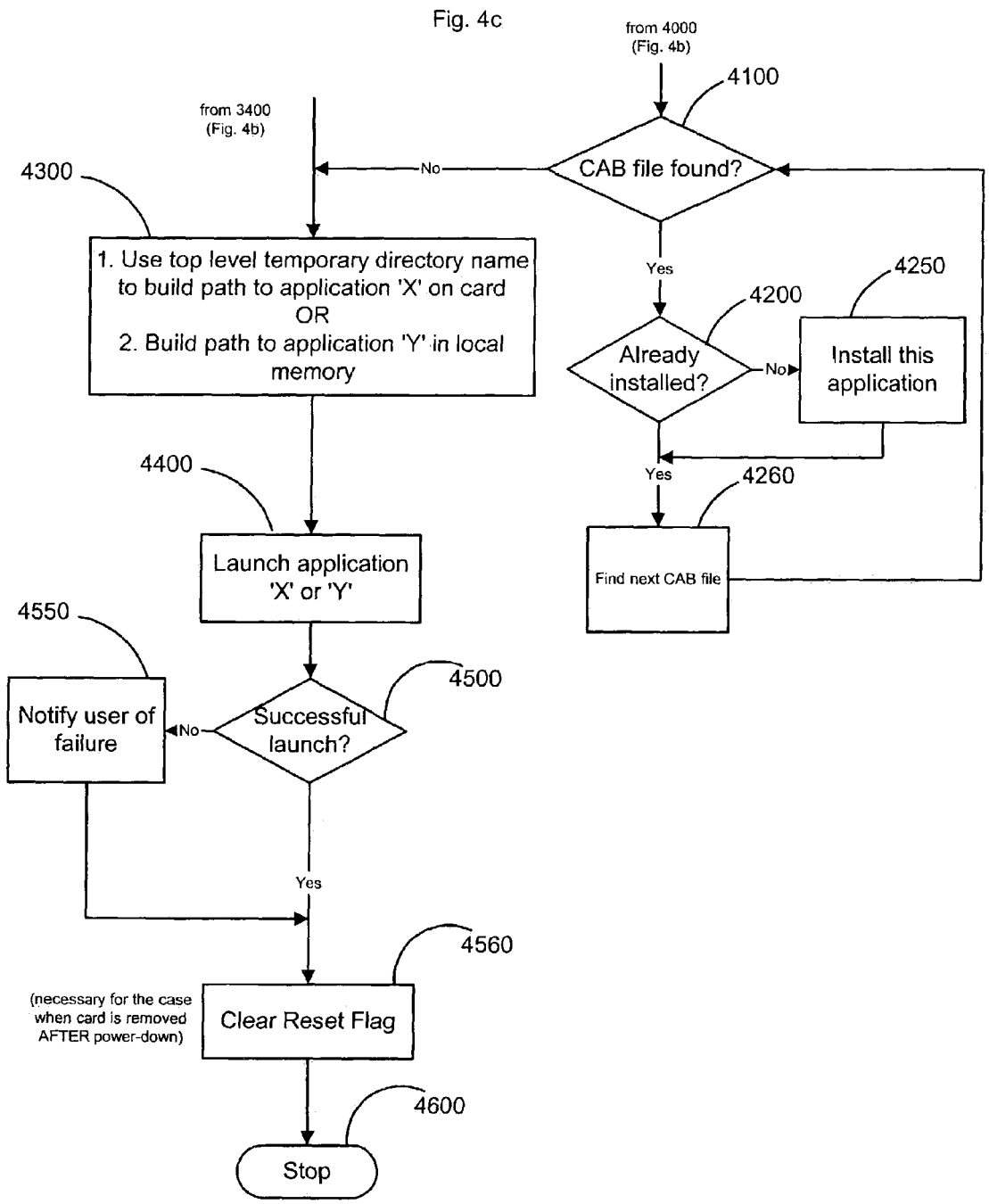

SYSTEMS AND METHODS FOR MANAGING AND PRESENTING MULTIMEDIA AND CONTENT RICH DATA ON A REMOVABLE MEMORY APPARATUS

FIELD OF THE INVENTION

The various embodiments disclosed herein relate to portable computing and wireless devices, and more particularly to systems and methods for managing and presenting multimedia and content rich data on said devices, accessed from a removable memory apparatus.

BACKGROUND OF THE INVENTION

The rising popularity of portable/handheld computing devices, such as the Windows Mobile or the Palm, and wireless devices, e.g., cellular phones, have led to the rise in demand for content on such devices, e.g., video games, music files, video clips, scheduling software, email software, etc.

One popular method for loading such content into such devices is through removable memory apparatuses, such as solid state memory cards, e.g., Secure Digital Cards ("SD"), Multi-Media Cards ("MMC"), Compact Flash memory cards, or memory sticks, which are small, thin, removable, low powered data storage devices. Other examples of removable memory apparatuses are microdrives, such as Hitachi's Microdrives, which have micro-mechanical parts, e.g., servos.

A removable memory apparatus can be inserted into a handheld device so the device can read the data from the memory apparatus and either install software from the apparatus into the device's own memory or launch programs from the apparatus. In some cases, it may be desirable to automatically launch content rich data, such as graphical images or multimedia files, residing on the removable memory apparatus and display the content rich data on the screen of the handheld device some time after the apparatus has been inserted into the device. For example, it may be desirable to place advertisements in the form of movies on a removable memory apparatus and then launch and display the advertisements on the screen of the handheld device after the apparatus has been inserted into the device. However, users may be frustrated if such advertisements appear every time a removable memory apparatus is inserted, thus it is desirable to manage such content.

Accordingly, a system and method for managing and viewing content rich data from a removable memory apparatus would be desirable.

SUMMARY OF THE INVENTION

The various embodiments disclosed herein are generally directed towards systems and methods for managing and displaying content rich data residing on a removable memory apparatus inserted into a handheld device. In one aspect of the various embodiments disclosed herein, a process comprises launching and displaying the content rich data soon after the device is inserted into a handheld device and monitoring the number of times the content rich data was launched and displayed. If the content rich data was launched a specific number of times, then the content rich data is deleted from the handheld device.

BRIEF DESCRIPTION OF THE DRAWINGS

In order to better appreciate how the above-recited and other advantages and objects of the various embodiments disclosed herein are obtained, a more particular description will be rendered by reference to specific embodiments thereof, which are illustrated in the accompanying drawings. Understanding that these drawings depict only typical embodiments are not to be considered limiting of the scope of the various embodiments of the invention disclosed herein. These specific embodiments will be described and explained with additional detail through the use of the accompanying drawings in which:

FIG. 2a is a flowchart of an exemplary content rich data server.

FIG. 2b is the remainder of the flowchart in FIG. 2a.

FIG. 4b is a continuation of the flowchart in FIG. 4a.

FIG. 4c is the remainder of the flowchart in FIGS. 4a and 4b.

DETAILED DESCRIPTION OF THE PREFERRED EMBODIMENTS

Figure 1:
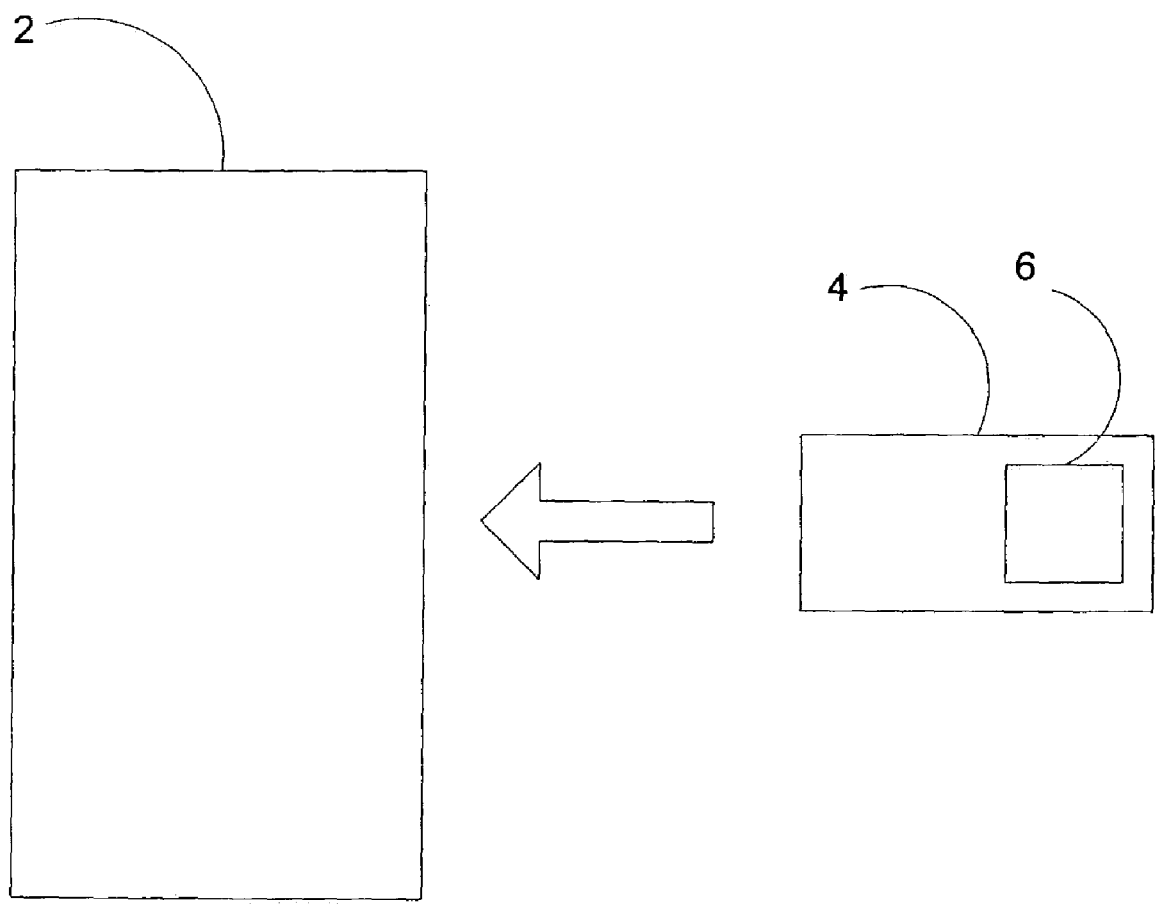
FIG. 1 is a diagram of a handheld device and removable memory apparatus.

Turning to FIG. 1, as mentioned above, in many instances, it may be desirable to put content rich data 6, such as audio, graphical, and multimedia data, onto one or more removable memory apparatuses 4, such as, but not limited to, micro-mechanical drives, memory sticks, solid state memory cards, e.g., SD's, MMC's or Compact Flash cards, One-Time Programmable ("OTP") Cards, 3D semiconductor memory devices, nano-magnetic core memory devices, organic and inorganic molecular storage media, and quantum effect storage devices.

Then, some time after a memory apparatus 4 is inserted into a handheld device 2, such as a Windows Mobile, Palm, or cellular phone, have the content rich data 6 launched and presented within the device 2. For example, it may be desirable to put graphical advertisement banners, news broadcasts, music, and/or videos on a removable memory apparatus 4 and then soon after the memory apparatus 4 is inserted into handheld device 2, have the banners, broadcasts, music, and/or videos launch and be presented, played, or displayed within the device 2. The content 6 may be locked onto the apparatus 4. For example, for either Flash or ROM cards, the content 6 may be locked such that it cannot be erased or manipulated. On Flash cards, this may be configured as an option, but for ROM cards, this may be the only setting.

Figure 2B:
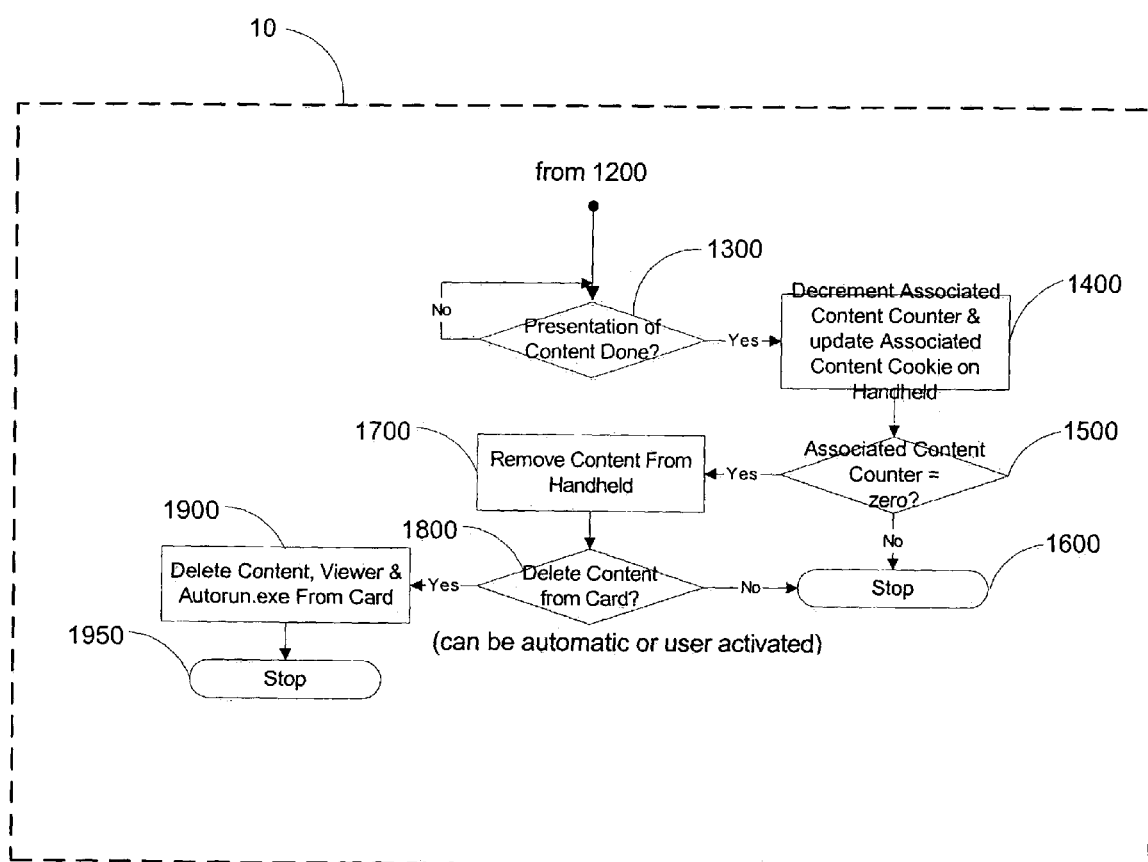

One approach to managing and launching content rich data 6 residing on a removable memory apparatus 4 is shown as a flowchart in FIGS. 2a and 2b. Turning to FIG. 2a, a removable memory apparatus 4, having one or more content rich data files 6, is first inserted into a handheld device 2 (action block 1100). Generally, when a memory apparatus 4 is inserted into a particular handheld electronic device 2, the device 2 automatically looks for a particular directory. For example, if the handheld device 2 has an ARM 720 central processing unit ("CPU") and the Windows Mobile operating system ("OS"), then the device 2 will automatically look for a directory labeled "1824". Further, the device 2 will generally look for a particular files which could be a program or a data file—a file that contains data. If a device 2 is looking for a program, and that program exists, then the device will execute or run the program. If the device 2 is looking for a data file, and that file exists, then the device will read the data file for instructions on launching or installing a particular program. For example, if the device has the ARM 720 CPU and the Windows Mobile OS, then the OS will search for a directory called "1824", and within that directory the device will look for and execute a program called "autorun.exe" 10.

The framework or shell for autorun.exe 10 is provided by Microsoft and can be found at: http://msdn.microsoft.com/library/default.asp?url=/library/en-us/wccsetup/htm/_wcesdk_using_autorun_on_the_pocket_pc.asp. The framework only provides source code for automatically installing an application, but does not provide source code for launching other applications. However, as can be appreciated by one of ordinary skill in the art, since the source code is available, a programmer can enhance the code and add new features.

When autorun.exe 10 is launched, (action block 200), code may be added to autorun.exe 10 to search for a particular content cookie on the device 2 that is associated with a particular content rich data file 6 on the memory apparatus 4 (action block 400) after autorun.exe 10 has started (action block 300). A "cookie" is a generic file that resides on a computing device, such as a handheld device, that can be programmed to log a user's interaction with one or more programs or data files, among others. A cookie is often small in size and typically includes information such as programs that have been launched on the device, how many times those programs have been launched, and how the user has interacted with those programs, e.g., if the user clicked on any hyperlinks within the programs. There is generally at least one cookie associated with at least one content rich data file 6 on the memory apparatus 4.

If an associated cookie is not found (decision block 500), then autorun.exe 10 will install an associated cookie on the handheld device 2 and will preset a counter in the cookie to a particular value, n (action block 600). The counter will indicate how many times a particular content rich data file 6 can be viewed and will track how many times it has been launched.

If an associated cookie is found (decision block 500), then autorun.exe 10 will search for the counter in the cookie and determine the value. If the value of the counter is zero (decision block 700), then that indicates that the content rich data has been displayed on the particular device 2 a maximum number of times and will not be displayed again. The purpose of this limit is to not frustrate the user of the handheld device 2. The process may just end there, or, in the alternative, autorun.exe 10 may search for whether there is a viewer program residing on the device 2 for viewing the content rich data 6 (action block 800). If so (decision block 900), then autorun.exe 10 will remove the viewer program (action block 1000) since the content rich data 6 will not be launched anymore on that device 2. The process will then end (stop block 1100). If a viewer program was not found on the device 2 (decision block 900), then the process will end (stop block 1100).

If the value of the counter is not zero (decision block 700), or if an associated cookie was just installed (action block 600), then subsequently, autorun.exe 10 will look for a program on the device 2 that will present the content rich data 6, such as a media viewer that can play MPEG content files and Windows Media content files (action block 750). One embodiment of a content rich data viewer will be described below. If a viewer is not found on the device 2 (decision block 850), then autorun.exe 10 will install an appropriate viewer on the device 2 (action block 950). Then, the autorun.exe 10 will launch the viewer (action block 1200). If a viewer is found on the device 2 (decision block 850), then autorun.exe 10 will launch the viewer (action block 1200) and display the content rich data 6, which could be video, audio, textual, and/or graphical data, on the handheld device 2.

Turning to FIG. 2b, autorun.exe 10 then checks to see if the presentation of the content 6 is complete (decision block 1300). If not, then the process will continue. If the presentation is complete, then the value of the counter on the associated cookie will be decremented and information on the associated cookie will be updated, such as whether the user interacted with the content rich data 6, and if so, what interaction occurred, e.g., whether the user clicked (i.e., selected) on a hyperlink within the content rich data 6 being displayed (action block 1400). If, after the counter is decremented, the counter is still not zero (decision block 1500), then the process will end (stop block 1600), and remaining operation will continue. The next time the apparatus is inserted into the device 2, the content 6 will be displayed again. If the counter does reach zero (decision block 1500), then the content rich data is removed from the handheld device, 2 (action block 1700), because the number of times the content rich data was launched and displayed has reached its limit. Subsequently, autorun.exe 10 may either delete the content rich data from the memory apparatus 4 (decision block 1800) or end the process (stop block 1600). If the content 6 is to be removed from the memory apparatus 4 (decision block 1800), then the content 6, the viewer, and/or autorun.exe may be deleted from the memory apparatus 4 (action block 1900), and then the process will end (stop block 1950). The counter in this embodiment decrements from a value n to zero. Alternatively, the counter may start from zero and increment until it reaches the value n. The value n may be set to any value. The counter may be device 2 specific. Thus, if the value n is set to one, the content 6 on a apparatus will only be displayed once per each device 2 the apparatus is inserted into.

Figure 3:
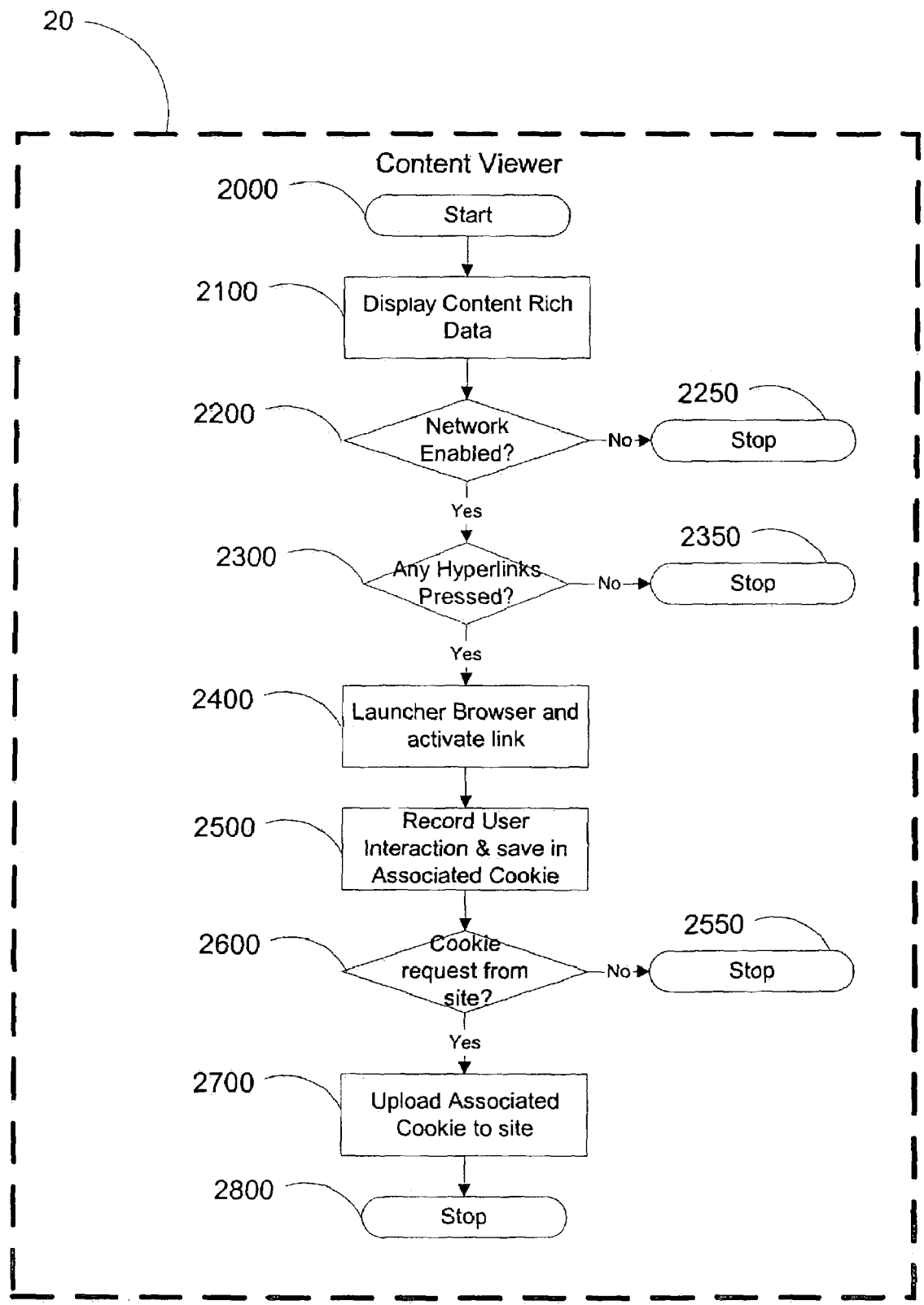
FIG. 3 is a flowchart of an exemplary content rich data viewer.

The content viewer program used to display the content rich data 6 on the memory apparatus 4 may be an existing commercially available viewer, such as Apple Computer's Quicktime media player, Microsoft's Windows media player, RealAudio's RealPlayer, or an HTML browser. Of course, the disclosure herein is not limited to any specific type of viewer, as the teachings herein are applicable to any viewer. In addition, the content viewer 20 may be in accordance with an embodiment described as follows and as shown in a flowchart in FIG. 3.

After the content viewer program 20 starts (start block 2000), the program 20 launches and displays the content rich data 6 (action block 2100). This may be an uninterrupted presentation of the content rich data 6. The program 20 then determines whether the handheld device 2 is network enabled (decision block 2200) i.e., whether the device 2 has access to a network either wirelessly or through a local area network ("LAN"). If not, then the program 20 will end after displaying the content 6 (stop block 2250). If so, then the program 20 will determine whether the user interacted with the content 6 such that the content 6 caused data to be sent or received across the network, e.g., whether the user clicked on any hyperlinks (decision block 2300) which causes data to be sent or received to and from the Internet. If not, then the program 20 will end (stop block 2350). If so, then the program 20 will launch a web browser, which may be located on the device 2 or the memory apparatus 4, and activate the link to the website that the user selected (action block 2400). The program 20 will then record the user interaction and store the information in the associated cookie located on the device 2 (action block 2500).

The program 20 will then determine whether the selected website requested the associated cookie (decision block 2600). If not, then the program 20 will end (stop block 2550). If so, then the program 20 will upload the associated cookie to the site (action block 2700), and then the program will end (stop block 2800). The purpose of uploading the cookie to the site (action block 2700) is to provide analysis on the user's interaction with the content rich data. The cookie information may be sent to a server for review. This information may be analyzed to determine who is viewing the content rich data 6, what types of devices 2 are being used, what types of memory apparatuses 4 are being used, how many times, etc.

A memory apparatus 4 may include content rich data for more than one type of handheld device 2. For example, the memory apparatus 4 may include content rich data for the Palm handheld computing environment and the Windows Mobile handheld computing environment. Each type of device may have its own "auto launch" program, such as autorun.exe. Systems and methods for enabling the support of multiple handheld devices is described in U.S. patent application Ser. No. 10/377,093, entitled "Universal Loader for Portable Electronic Devices, filed on Feb. 27, 2003, which is hereby incorporated by reference in its entirety.

Figure 4A:
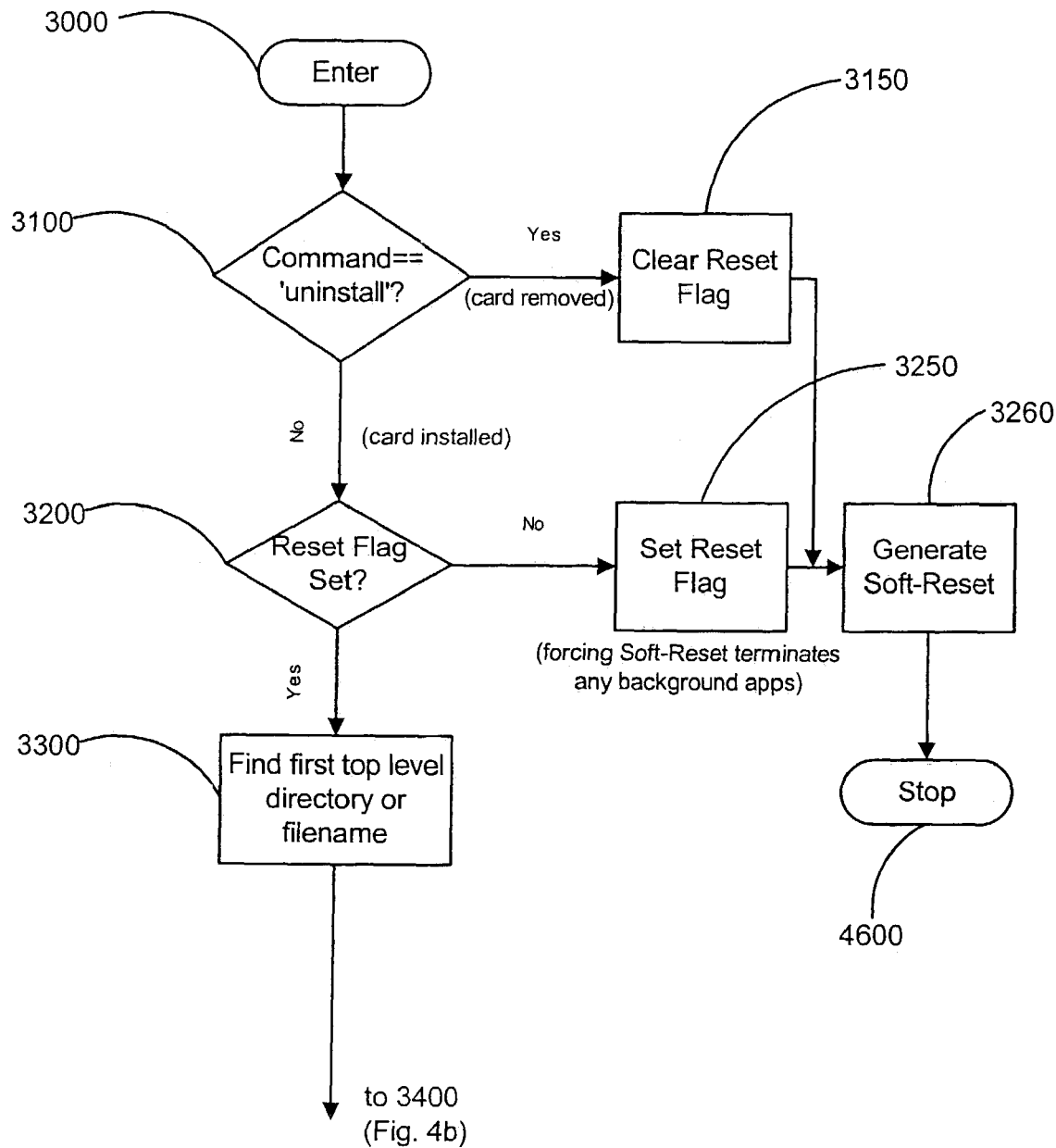
FIG. 4a is a flowchart of a universal loader.
Figure 4B:
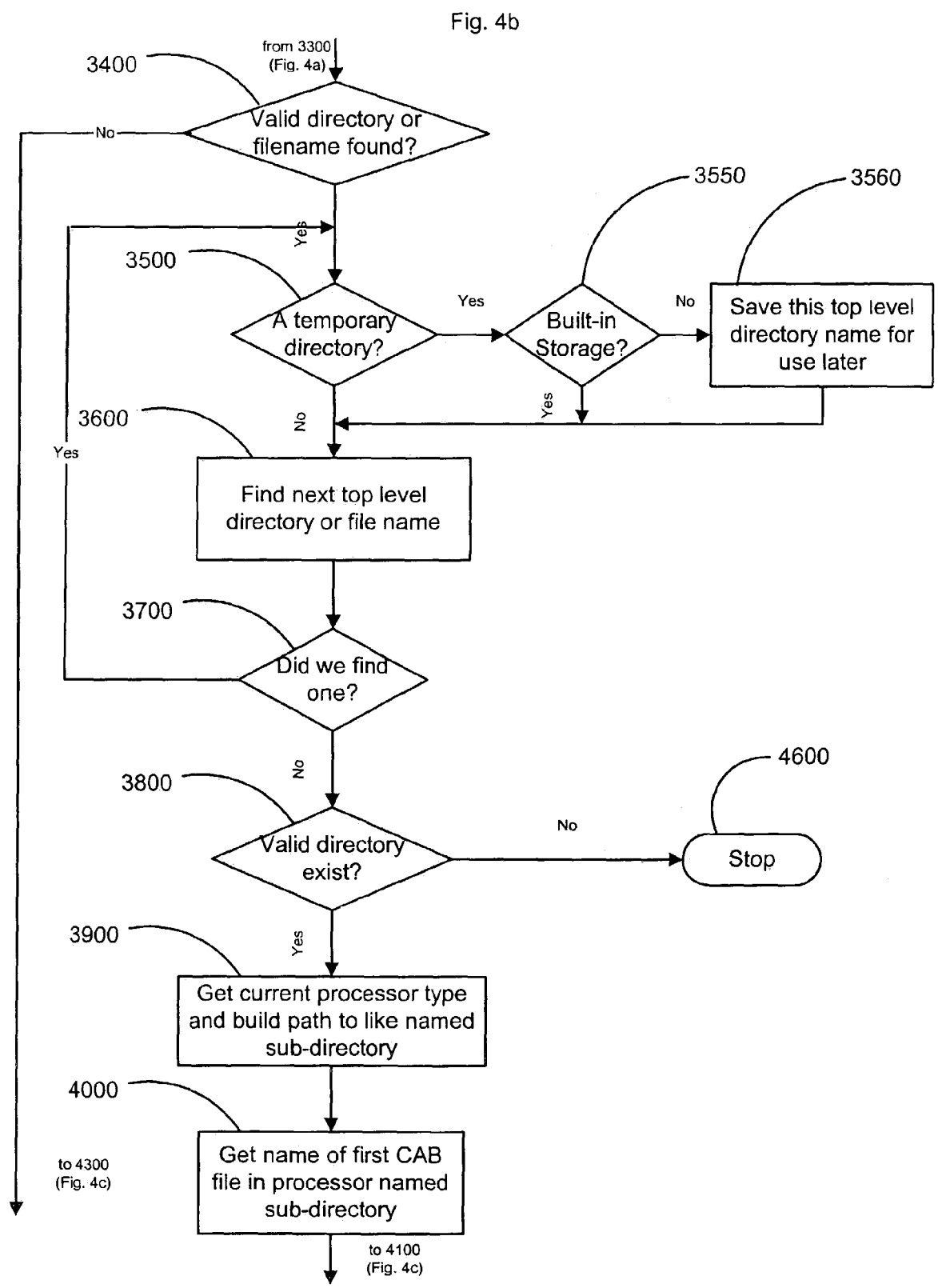

Turning to FIGS. 4a, 4b, and 4c, a detailed flowchart of an implementation of autorun.exe that enables support for multiple handheld devices 2 is shown. This implementation may be added to autorun.exe in addition to the implementation described above. When a memory apparatus 4 having software and/or content rich data 6 is inserted into a device having the Windows Mobile OS, the device will search for the respective directory and search for autorun.exe in the respective directory. If found, the device will launch autorun.exe (enter block 3000). Autorun.exe will first check to see if an "uninstall" argument has been passed (decision block 3100). If so, then that indicates that the memory apparatus has been removed from the device and autorun.exe will clear a "reset flag" (action block 3150). The reset flag will indicate whether the autorun.exe should install software onto the memory's device. If the autorun.exe is instructed to not install the software, it may be because the memory apparatus is not available or the software has already been installed. Subsequently, autorun.exe will perform a "soft-reset", wherein it will reboot the Pocket PC device (action block 3260) and then terminate itself without removing any files from the device's memory (action block 4600).

Turning back to decision block 3100, if the uninstall argument was not passed, then that indicates that the memory apparatus is still inserted into the device. Autorun.exe will then check if the reset flag was set (decision block 3200). If it was not set, then autorun.exe will set the reset flag (action block 3250), perform a soft-reset (action block 3260) and then terminate itself (action block 4600). If the reset flag was set (decision block 3200), then autorun.exe will search for the first top level directory or filename in the device's memory (action block 3300). If there is no valid directory or filename found (decision block 3400), then autorun.exe will either use a top level temporary directory name to build a path to a particular application on the memory apparatus, or it will build a path to a particular application already in the device's memory, depending on how the installation process is prepared and how autorun.exe is programmed and configured (action block 4300).

Subsequently, autorun.exe will launch the particular application, either from the device's memory or from the memory apparatus (action block 4400). If there was a successful launch (decision block 4500), then autorun.exe will clear the reset flag (action block 4560), which is necessary for the case when the memory apparatus is removed from the device after the device powers down. Autorun.exe will then close itself or terminate itself (stop block 4600). If the launch was not successful, then autorun.exe will notify the user of the failure, e.g., through a graphical window that pops up in the display of the device.

Turning back to decision block 3400, if there is a valid directory or filename found, then autorun.exe checks if the directory is a temporary directory (decision block 3500), e.g., a directory located on a removable Flash, ROM, or microdrive memory card. If it is a temporary directory, then the program checks if there is built-in storage (decision block 3550), such as embedded Flash memory. If it is not built-in storage, then the directory name is saved for later use (action block 3560) and then autorun.exe will search for the next top level directory or file name (action block 3600). If the temporary directory is built-in storage, then autorun.exe will skip it and search for the next top level directory or file name (action block 3600). Turning back to decision block 3500, if the valid directory or file name found is not a temporary directory, then autorun.exe will proceed to search for the next top level directory or file name (action block 3600). If one is found (decision block 3700), then autorun.exe will go back to decision block 3500 to determine if it is a temporary directory. If autorun.exe does not find a subsequent top level directory or file name (decision block 3700), then it will check to see if a valid directory does indeed exist (decision block 3800). If none exists, then there is a problem, e.g., no device is inserted, so it will terminate itself (stop block 4600).

If a valid directory does exist (decision block 3800), then autorun.exe will determine the current processor type and build a path to the valid directory, which could be either on a memory apparatus, either the memory apparatus that originated the autorun.exe or another memory apparatus, or in the device's memory (action block 3900). Next, the program gets the name of the first *.cab file from a corresponding subdirectory, e.g., from the subdirectory on the memory apparatus originating the autorun.exe corresponding to the device the device is inserted into, such as a subdirectory labeled "2577" if the device the memory apparatus is inserted into has a StrongArm SA11XX CPU (action block 4000). If the *.cab file is not found (decision block 4100), then it is possible that the program has already been installed or that there are no *.cab files to install, so the program will try to launch an application. The program will go to action block 4300, i.e., it will either use a top level temporary directory, name to build a path to a particular application on the memory apparatus, or it will build a path to a particular application already in the device's memory, depending on how the installation process is prepared and how autorun.exe is programmed and configured. If a *.cab file is found (decision block 4100), then the program checks if the contents of the *.cab file have already been installed on the device's memory (decision block 4200). If not, then the contents of the *.cab file will be installed on the device's memory in the valid directory (action block 4250). If so, then the program will not install the contents in the *.cab file and proceed to find the next *.cab file (action block 4260) and repeated decision block 4100.

It should be noted that the principles applied to autorun.exe above may be equally applied to any executable program designed to automatically install or execute software in a handheld electronic device from a memory apparatus.

As mentioned above, the various embodiments disclosed herein may take the form of a computer program comprising a series of instructions. In addition to removable memory apparatuses, these instructions may be supplied on other computer usable media, such as a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium.

Although particular embodiments have been shown and described, it will be understood that it is not intended to limit the disclosure to the preferred embodiments, and it will be obvious to those skilled in the art that various changes and modifications may be made without departing from the spirit and scope of the subject matter disclosed herein. Thus, the subject matter disclosed herein is intended to cover alternatives, modifications, and equivalents, which may be included within the spirit and scope of the claims.

What is claimed is:

1. A method for managing content rich data residing on a removable memory apparatus that has been inserted into a handheld device, comprising:
   locking the content rich data residing on the removable memory apparatus such that said content rich data is not permitted to be erased by a user of said handheld device;
   establishing a connection between the removable memory apparatus and the handheld device;
   searching, by a program residing on the removable memory apparatus, for at least one content cookie having a counter that is programmed into memory residing within the handheld device upon having established said connection;
   installing at least one content cookie, having a counter, from the removable memory apparatus onto the handheld device if no content cookie was found when searching for the content cookie;
   searching within the handheld device for a content player enabled to present the content rich data;
   detecting the absence of a content player enabled to present the content rich data within the handheld device;
   installing a content player enabled to present the content rich data in response to detecting the absence of a content player enabled to present the content rich data existing on the handheld device;
   launching the content player enabled to present the content rich data;
   presenting the content rich data within the handheld device via the content player; and
   decrementing the counter of the content cookie wherein upon reaching a predetermined value by decrementing the counter of said content cookie, the content rich data is automatically removed from the handheld device.

2. The method of claim 1, wherein the content rich data is multimedia data.

3. The method of claim 1, wherein the content rich data is at least one graphical image.

4. The method of claim 1, wherein the content rich data is an audio file.

5. The method of claim 1, wherein the handheld device has a display screen, and the method further comprises the step of displaying the content rich data on the screen.

6. The method of claim 1, wherein the removable memory apparatus is a memory stick.

7. The method of claim 1, wherein the removable memory apparatus is a solid state memory apparatus.

8. The method of claim 1, wherein the removable memory apparatus is a micro-mechanical drive.

9. The method of claim 1, wherein the handheld device is communicatively coupled to the Internet and further wherein the content rich data includes one or more links to one or more Websites associated with the content rich data.

10. The method of claim 9, wherein the one or more links are hyperlinks that, when invoked by a user, will launch a Web browser and open a webpage associated with the hyperlink.

11. The method of claim 1, the method further comprising removing the content rich data from the handheld device when the counter reaches zero.

12. The method of claim 1, the method further comprising:
   storing information in the at least one content cookie wherein the information represents user interaction with the content rich data; and uploading the at least one content cookie to a server.

13. The method of claim 1, wherein the counter is specific to the handheld device such that the content rich data will be presented the predetermined number of times per each device that the memory apparatus is inserted into.

14. The method of claim 1, further comprising:
   removing the content player enabled to present the content rich data from the handheld device wherein the content rich data will not be presented again on the handheld device.

15. A computer program product that includes a computer-usable medium having a sequence of instructions which, when executed by a processor, causes said processor to execute a process for displaying content rich data residing on a removable memory apparatus within a handheld device soon after the device is inserted into the handheld device, said process comprising:
   locking the content rich data residing on the removable memory apparatus such that said content rich data is not permitted to be erased by a user of said handheld device;
   establishing a connection between the removable memory apparatus and the handheld device;
   searching, by a program residing on the removable memory apparatus, for at least one cookie having a counter that programmed into memory residing within the handheld device upon having established said connection;
   installing at least one content cookie, having a counter, on the handheld device if no content cookie was found when searching for the content cookie;
   searching within the handheld device for a content player enabled to present the content rich data;
   detecting the absence of a content player enabled to present the content rich data within the handheld device
   installing a content player enabled to present the content rich data in response to detecting the absence of a content player enabled to present the content rich data existing on the handheld device;
   launching a content player enabled to present the content rich data;

presenting the content rich data within the handheld device via the content player; and decrementing the counter of the content cookie wherein upon reaching a predetermined value by decrementing the counter of said content cookie, the content rich data is automatically removed from the handheld device.

16. The computer program product of claim 15, wherein the content rich data is multimedia data.

17. The computer program product of claim 15, wherein the content rich data is at least one graphical image.

18. The computer program product of claim 15, wherein the content rich data is an audio file.

19. The computer program product of claim 15, wherein the handheld device has a display screen, and the method further comprises the step of displaying the content rich data on the screen.

20. The computer program product of claim 15, wherein the removable memory apparatus is a memory stick.

21. The computer program product of claim 15, wherein the removable memory apparatus is a solid state memory card.

22. The computer program product of claim 15, wherein the removable memory apparatus is a micro-mechanical drive.

23. The computer program product of claim 15, wherein the handheld device is communicatively coupled to the Internet and further wherein the content rich data includes one or more links to one or more Websites associated with the content rich data.

24. The computer program product of claim 23, wherein the one or more links are hyperlinks that, when invoked by a user, will launch a Web browser and open a webpage associated with the hyperlink.

25. The computer program product of claim 15, wherein the process for displaying content rich data residing on a removable memory apparatus within a handheld device soon after the device is inserted into the handheld device further comprises:

storing information in the at least one content cookie wherein the information represents user interaction with the content rich data; and uploading the at least one content cookie to a server.

26. The computer program product of claim 15, wherein the counter is specific to the handheld device such that the content rich data will be presented the predetermined number of times per each device that the memory apparatus is inserted into.

27. The computer program product of claim 15, wherein the process for displaying content rich data residing on a removable memory apparatus within a handheld device soon after the device is inserted into the handheld device further comprises:

removing the content player enabled to present the content rich data from the handheld device wherein the content rich data will not be presented again on the handheld device.

* * * * *